UNITED STATES PATENT OFFICE.

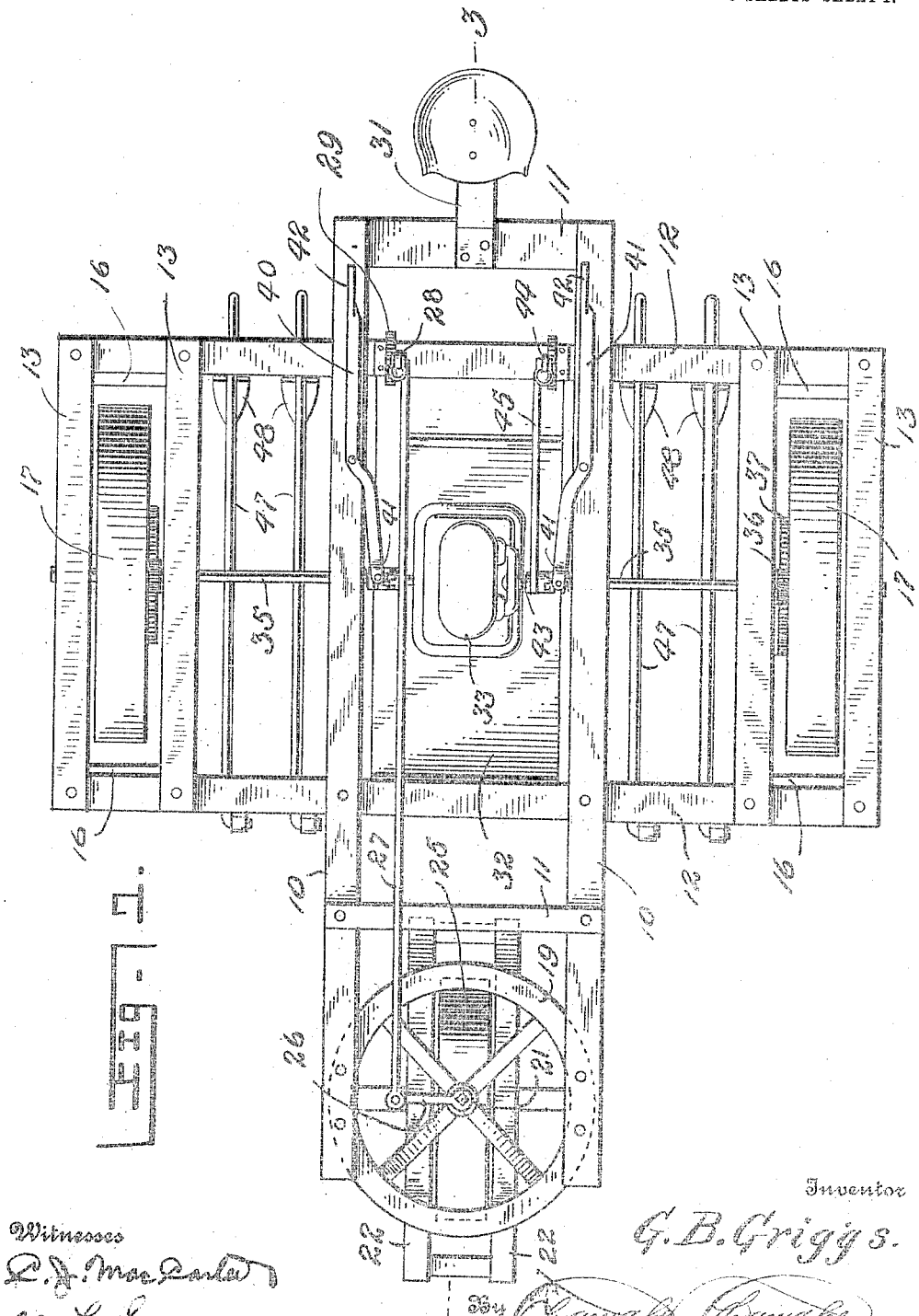

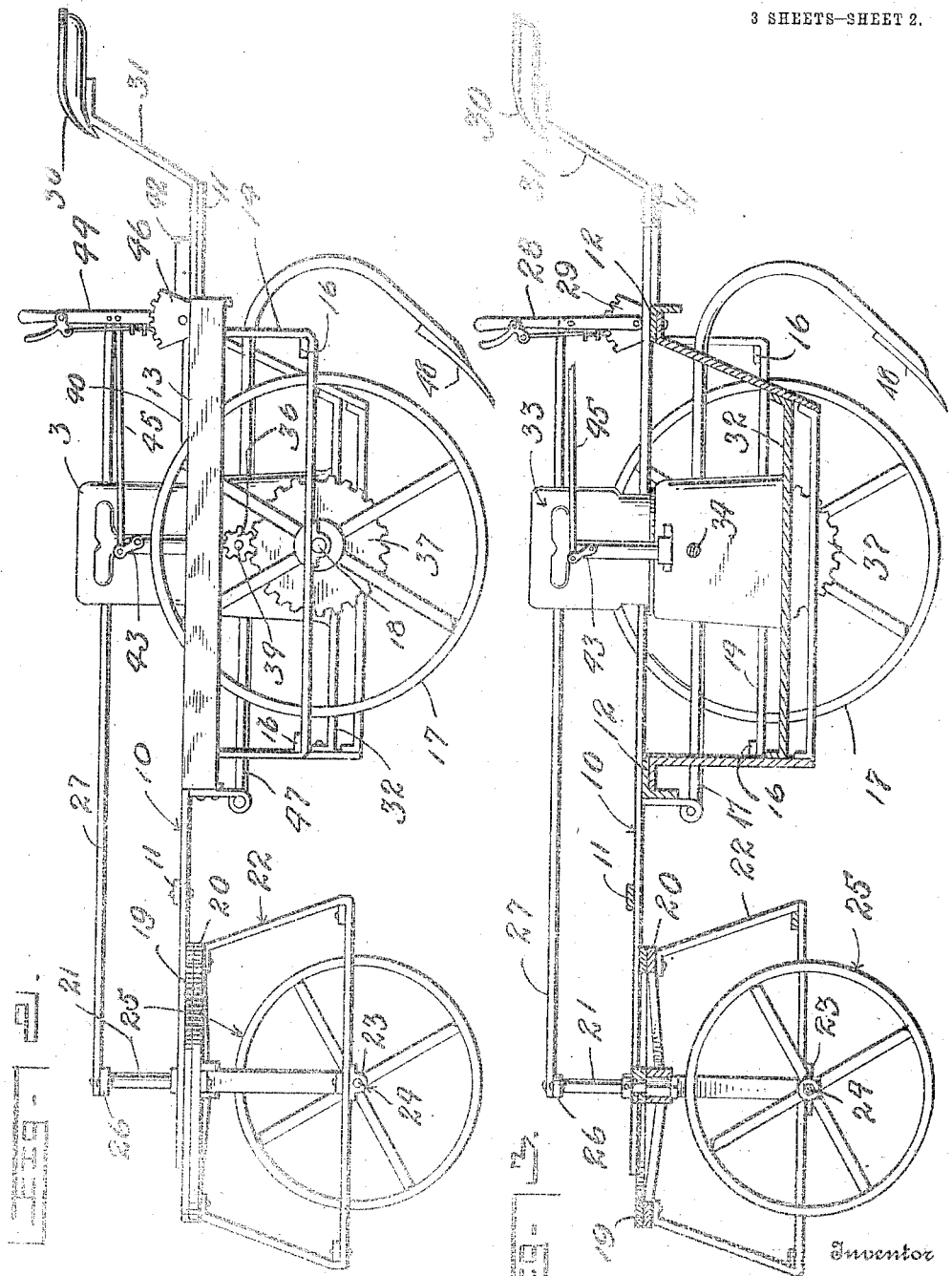

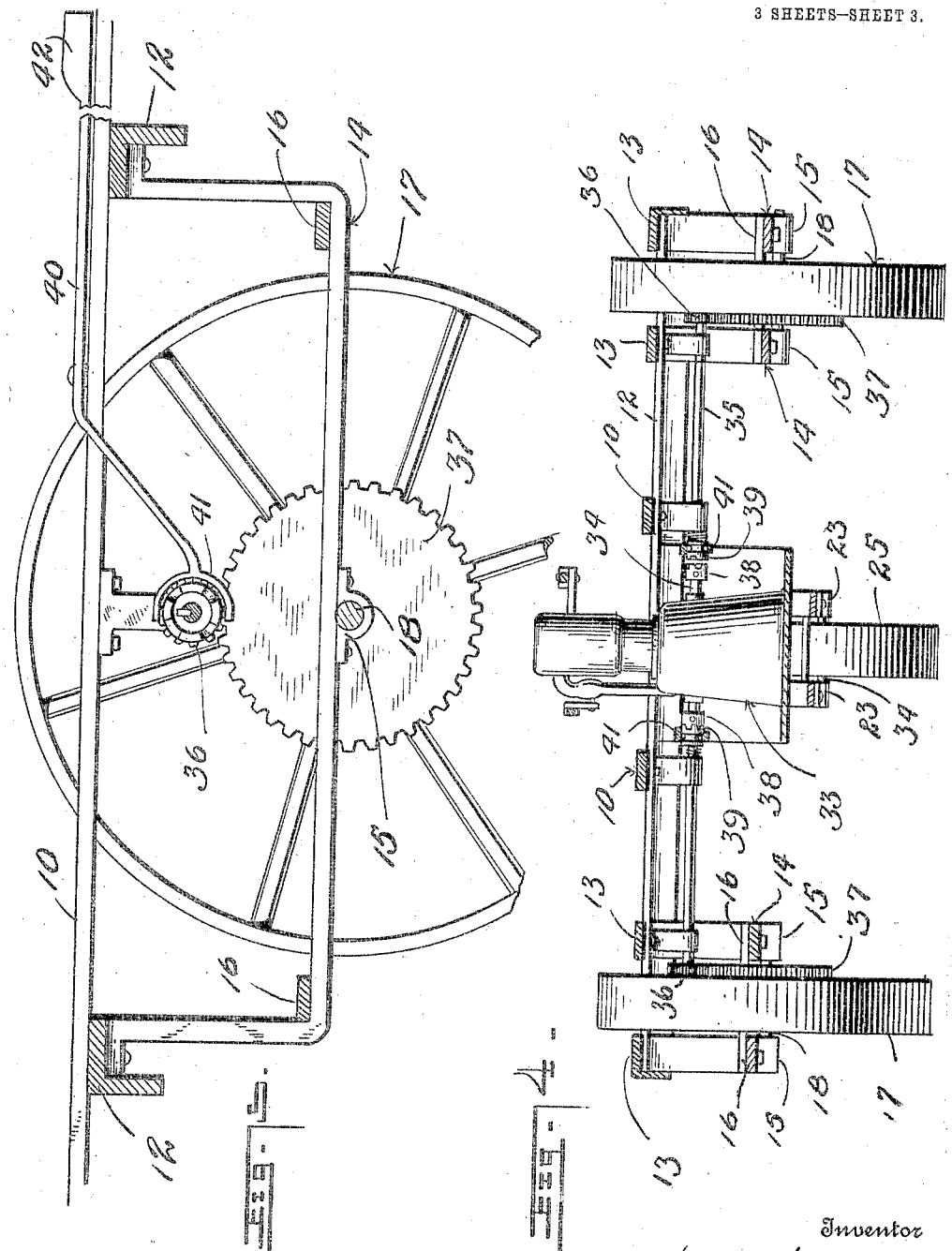

GEORGE B. GRIGGS, OF DOUGLAS, KANSAS.

AGRICULTURAL IMPLEMENT.

1,076,761.

Specification of Letters Patent. Patented Oct. 28, 1913.

Application filed August 7, 1912. Serial No. 713,892.

*To all whom it may concern:*

Be it known that I, GEORGE B. GRIGGS, a citizen of the United States, residing at Douglas, in the county of Butler, State of Kansas, have invented certain new and useful Improvements in Agricultural Implements; and I do hereby declare the following to be a full, clear, and exact description of the invention, such as will enable others skilled in the art to which it appertains to make and use the same.

This invention relates to agricultural implements and has special reference to a novel form of motor driven vehicles, to which plows, harrows and other like earth working tools may be attached.

The principal object of the invention is to provide an improved form of frame so arranged that the weight of the engine which drives the device is kept relatively low while the frame is arranged to pass over two rows of corn without injuring the growing plants.

With the above and other objects in view the invention consists in general of certain novel details of construction and combinations of parts hereinafter fully described, illustrated in the accompanying drawings, and specifically set forth in the claim.

In the accompanying drawings, like characters of reference indicate like parts in the several views, and Figure 1 is a plan view of the invention. Fig. 2 is a side elevation thereof. Fig. 3 is a longitudinal median section of the device on the line 3—3, Fig. 1. Fig. 4 is a transverse section taken through the engine bed plate. Fig. 5 is an enlarged detail of a portion of certain mechanism, in driving the rear wheels of the invention.

The main frame of the device comprises a pair of longitudinally extending members 10 which are connected by transverse members 11 so that a substantially rectangular frame work is thus formed. Extending across beneath the members 10 are transverse supplemental frame members 12 which are spaced apart and which are connected at their outer ends by longitudinal members 13, there being a pair of these members 13 on each side of the main frame and the members of each pair being spaced apart. Immediately beneath the members 13 are depending U-shaped frames 14 to the under side of which are attached bearings 15. These frames 14 are connected in pairs by ties 16 and between each pair of the members 14 is a ground wheel 17, these ground wheels being carried on short axles 18 journaled in the bearings 15. The parts are so proportioned that the main frame members 30 are held elevated to a height nearly equal the diameter of the ground wheels thus making it possible to run the machine over growing plants without injury to the latter.

At the forward end of the main frame is a fifth wheel which consists of an upper fifth wheel member 19 and a lower fifth wheel member 20. This lower fifth wheel member is fixed on a vertical shaft 21 which passes through a suitable opening made in the upper fifth wheel member. To the under side of the lower member 20 is attached a pair of substantially U-shaped frames 22 beneath which are fixed bearings 23 wherein is journaled an axle 24. This axle serves to carry a steering wheel 25 and in order to change the position of this steering wheel the shaft 21 is provided with a crank arm 26 extending laterally thereof and having a link 27 connected thereto. This link extends backward to a position adjacent the rear of the main frame and is there connected to a latch lever 28 arranged in coöperative relation to a quadrant 29, the latter being fixed to the main frame. This latch lever is positioned to the rear of the main frame so that it may be adjacent the driver's seat 30 which is supported on a suitable standard 31 connected to the main frame.

Between the lateral frames carrying the ground wheels 17 there is provided an engine bed plate 32 which is of U-shape and depends from the main frame structure. By reason of this bed plate being of this shape the weight of the engine 33 is brought very low so that the entire vehicle is very stable. This engine is provided with the usual shaft 34 and alined with this shaft are lateral shafts 35. On each of these lateral shafts 35 is a gear 36 which meshes with a gear 37 carried on the respective ground wheel 17. On each end of the shaft 34 is a clutch member 38 and slidably mounted on each of the shafts 35 is a clutch member 39 which is adapted for engagement with the respective clutch member 38 so that the shafts 35 may be connected to the shaft 34. In order to control these clutches shipper levers 40 are pivoted to the frame intermediate their ends and are provided with the usual shipper forks 41 which engage the sliding clutch members 39. These shipper levers are also provided with pedals 42 so that they may be moved to bring the clutches in or out of engagement by the operator's feet. The engine 33 is provided with the usual controlling lever 43 and this lever 43 is connected to a latch lever 44 by means of a link 45. The latch lever 44 is arranged in coöperative relation with a quadrant 46 which is positioned on a frame adjacent the driver's seat 30. To the frame are attached earth working tools and for the purpose of illustrating the application of the invention there has here been shown the device equipped with cultivator beams 47 carrying cultivator shovels 48. It is however, to be observed that other earth working tools may be used in connection with the invention and that those here illustrated are to be taken as typical of the arrangement of any such tools and that it is not desired to confine the invention to the specified application of a cultivator.

In the operation of the device the driver, seated at 30, controls with his left hand the engine lever 44 and with his right hand the steering lever 28. His feet engage the pedals 42 so that he can move either these pedals or both and connect the shaft sections. When the operator desires to go to the right he moves the steering wheel in the proper direction and if he wishes to make a rapid turn he moves the right hand pedal to disengage the right hand shaft section 35 while holding the left hand pedal in its engaged position. In order to go to the left he of course reverses these movements.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown, but it is wished to include all such as properly come within the scope of the appended claim.

What is claimed is:—

In a device of the kind described, a main frame, a lateral frame on each side of the main frame and rigidly connected to the main frame, a pair of spaced depending U-shaped frames fixed at the outer end of each lateral frame, a fifth wheel including upper and lower members at the forward end of the main frame, a pair of spaced depending U-shaped frames connected to the lower member of the fifth wheel, ground wheels mounted between the frames of each pair, a steering device operatively connected to the front pair of frames and an engine bed plate depending from the main frame between the lateral frames.

In testimony whereof, I affix my signature, in presence of two witnesses.

GEORGE B. GRIGGS.

Witnesses:
N. A. YEAGER,
C. E. LICHLYTER.